United States Patent
Appleton et al.

(10) Patent No.: US 7,146,445 B2
(45) Date of Patent: Dec. 5, 2006

(54) DAUGHTERCARD-BASED SYSTEM SOFTWARE AND HARDWARE FUNCTIONALITY-DEFINING MECHANISM

(75) Inventors: Robert Scott Appleton, Madison, AL (US); Patrick Steven Grant, Laceys Spring, AL (US); David Etzkorn, Hazel Green, AL (US)

(73) Assignee: Adtran, Inc., Huntsville, AL (US)

( * ) Notice: Subject to any disclaimer, the term of this patent is extended or adjusted under 35 U.S.C. 154(b) by 343 days.

(21) Appl. No.: 10/763,784

(22) Filed: Jan. 23, 2004

(65) Prior Publication Data
US 2005/0165991 A1    Jul. 28, 2005

(51) Int. Cl.
*G06F 13/00* (2006.01)
*G06F 13/20* (2006.01)

(52) U.S. Cl. .................. 710/301; 710/313
(58) Field of Classification Search ............ 710/2, 710/62, 72, 100, 301, 313
See application file for complete search history.

(56) References Cited

U.S. PATENT DOCUMENTS

| | | | |
|---|---|---|---|
| 6,009,500 A * | 12/1999 | Rossi | 711/162 |
| 6,381,662 B1 * | 4/2002 | Harari et al. | 710/301 |
| 6,789,146 B1 * | 9/2004 | Dlugosch | 710/100 |
| 2002/0142813 A1 * | 10/2002 | Cassidy et al. | 455/575 |

* cited by examiner

*Primary Examiner*—Fritz Fleming
*Assistant Examiner*—David Martinez
(74) *Attorney, Agent, or Firm*—Allen, Dyer, Doppelt, Milbrath & Gilchrist, P.A.

(57) ABSTRACT

A test apparatus for telecommunication equipment includes motherboard that executes a resident operation control mechanism, so that the test apparatus exhibits default hardware functionality. However, if a daughtercard has been plugged into the motherboard, the motherboard ignores the default firmware and executes whatever replacement operation control software is provided on the daughtercard—causing the test apparatus to acquire a hardware functionality exclusive of the motherboard default.

4 Claims, 1 Drawing Sheet

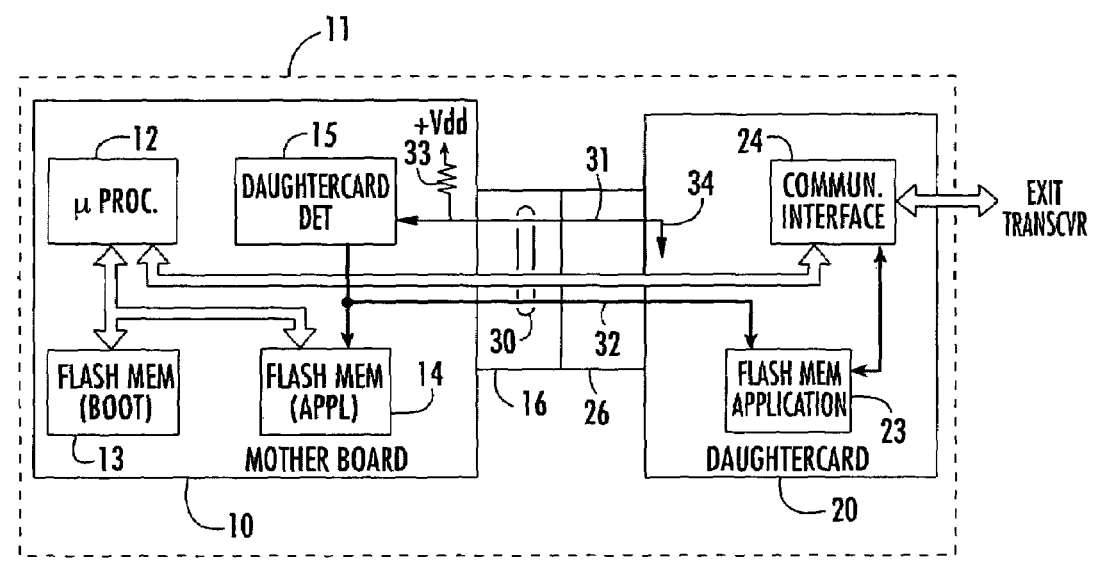

DAUGHTERCARD-BASED SYSTEM SOFTWARE AND HARDWARE FUNCTIONALITY-DEFINING MECHANISM

FIELD OF THE INVENTION

The present invention relates in general to electronic systems and subsystems therefor, such as but not limited to test apparatus for telecommunication equipment and components thereof, and is particularly directed to a mechanism for establishing both the software and hardware functionality of processor-controlled signal processing apparatus, in response to the presence of a daughtercard which contains such functionality, and imparts the same to the signal processing system's supervisory motherboard. In the absence of such a daughtercard, the motherboard executes a resident default operation control mechanism, so as to cause the equipment to exhibit the default hardware functionality of the base system. If a daughtercard is present, however, the motherboard executes whatever replacement operation control software is provided on the daughtercard—causing the signal processing equipment to acquire a hardware functionality exclusive of the motherboard default.

BACKGROUND OF THE INVENTION

Processor-controlled electronic systems are customarily provided with auxiliary card slots, that allow a user to augment the functionality of a base system with the installation of one or more daughtercards. Non-limiting examples include additional memory, printer cards, fax/modem cards, graphics accelerator cards, game cards, and the like. Now although these components serve to enhance or expand the original computer system with one or more additional operational or application features, they do not, nor are they intended to, effectively modify the hardware functionality of the base system. The base information processing system still performs all of its previous functions. Where modification of the hardware functionality of the base processing system is desired, it is customary practice to provide an upgrade of the base system software installed on the motherboard, coupled with installation, or replacement, of whatever hardware is associated with the new software. It goes without saying that such a conventional approach to system modification is undesirably labor-intensive, time-consuming and costly.

SUMMARY OF THE INVENTION

In accordance with the present invention, shortcomings of conventional schemes for upgrading the hardware and software of a conventional processor-controlled electronic utility (e.g., information signal processing) system, such as those described above, are effectively obviated by causing the overall operation and hardware functionality of an upgraded or modified base system to be daughtercard-dependent. Namely, if a daughtercard is present, the motherboard will execute whatever replacement operation control software is provided on the daughtercard—causing the signal processing equipment to acquire a hardware functionality different from the motherboard-based default.

For this purpose, as in a conventional system, the base system's motherboard includes a system-controlling microprocessor, boot flash memory, application flash memory containing default system functionality firmware, and a daughtercard detector logic circuit. When the base system is turned on, or reset, it boots up by executing the software in the boot flash memory. Whether it is to execute the default application firmware stored in its application flash memory or separate and distinct firmware contain in flash memory on the daughtercard depends upon whether the daughtercard detector logic circuit has detected the presence of a daughtercard.

Pursuant to the invention, the daughtercard has its own application flash memory containing operational firmware associated with on-board hardware such as a digital communication transceiver. The functionality of the application firmware in the daughtercard's flash memory is based upon and is effective to control operation of both the daughtercard's on-board hardware as well as the overall operation of the motherboard in the course of executing the daughtercard's firmware. Namely, the daughtercard-resident firmware is intended to be executed by the motherboard processor 'in place of' the base system application firmware contained the default flash memory of the motherboard. This exclusive execution of daughtercard firmware is in direct contrast to a conventional system which continues to perform all of its previous functions when a daughtercard has been added.

In order to detect the presence of a daughtercard, the communication bus that links the motherboard to a daughtercard receptacle includes an application firmware control link signal that represents which application flash memory is to be accessed by the motherboard's processor. In the absence of insertion of a daughtercard, this control link is normally relatively weakly held at a high by a pull-up resistor coupled to a high logic level voltage rail. In this state motherboard's processor is steered to the default firmware within its own application flash memory. On the other hand, if a daughtercard has been inserted into the daughtercard receptacle, the daughtercard termination of the control link is grounded, which pulls the control link to a logical low. For this state the daughtercard detector logic circuit steers the motherboard's processor to the application firmware within daughtercard-resident flash memory.

Advantageously, because the application firmware stored in the daughtercard's flash memory is intimately related with and serves to control operation of the daughtercard's on-board hardware, and it is the daughtercard that defines the overall hardware and software complexion of the base system motherboard, no modification of either the hardware or the software of the motherboard is required.

BRIEF DESCRIPTION OF THE DRAWINGS

The single FIGURE diagrammatically illustrates a processor-based utility electronic utility control system employing a daughtercard-based software and hardware modification mechanism in accordance with the present invention.

DETAILED DESCRIPTION

Before describing the daughtercard-based system software and hardware functionality control mechanism in accordance with the present invention, it should be observed that the invention effectively resides primarily in a modular arrangement of conventional digital communication and signal processing circuits and components and associated software therefor. In a practical implementation that facilitates their being packaged in a hardware-efficient equipment configuration, this modular arrangement may be readily implemented as field programmable gate array (FPGA), or application specific integrated circuit (ASIC) chip sets. Consequently, the configuration of such arrangement of circuits and components and the manner in which they are interfaced with other equipment have, for the most part, been illustrated in the drawings by a readily understandable block diagram, which shows only those specific details that are pertinent to the present invention, so as not to obscure the disclosure with details which will be readily apparent to those skilled in the art having the benefit of the description herein. The block diagram illustration is primarily intended to show the major components of the invention in a convenient functional grouping, whereby the present invention may be more readily understood.

Attention is now directed to the single FIGURE, wherein an embodiment of the present invention is diagrammatically illustrated as comprising an electronic control system motherboard 10 installed in a base equipment support housing, identified by broken lines 11. As is common practice in processor-controlled electronic utility application systems, the motherboard contains a microprocessor 12, a boot flash memory 13 containing boot code, an application flash memory 14 containing default system functionality firmware, and a daughtercard detector logic circuit 15. As will be described, this latter circuit preferably comprises an address decode chip, that is operative to controllably generate a pair signals NFLASH_CSL and NFLASH_CSH for selecting flash memories on the motherboard. It is also operative to controllably generate a pair signals DFLASH_CSL and DFLASH_CSH for selecting flash memories on the daughtercard.

Whenever the base system is turned on, or reset, it boots up by executing the software in local flash memory 13. Whether it is to execute the default application firmware stored in flash memory 14 or separate and distinct firmware contain in flash memory on the daughtercard depends upon whether the daughtercard detector logic circuit 15 has detected the presence of a daughtercard. To detect the presence of a daughtercard, the logic circuit 15 is preferably programmed at manufacture with a prescribed set of control code, such as that set forth below.

More particularly, the motherboard 10 is provided with a standard daughtercard receptacle 16 that is configured to receive and be engaged by a corresponding card insertion element or terminal edge connector 26 mounted on a daughtercard 20. As pointed out briefly above, the daughtercard contains its own application flash memory 23, which contains operational firmware associated with onboard hardware 24, such as a prescribed communication transceiver interface (e.g. a DS3 communication interface, Ethernet interface, and the like). The application firmware contained in the flash memory 23 on the daughtercard is based upon and is effective to control operation of the daughtercard's onboard transceiver (hardware) 24, as well as the overall operation of the motherboard in executing the functionality of the daughtercard's firmware. Namely, the daughtercard-resident firmware is intended to be executed by the motherboard processor 12 'in place of' the base system application firmware contained the default flash memory 14 of the motherboard. (As described above, this is in contrast to a conventional system which, continues to perform all of its previous functions when a daughtercard has been added.)

For this purpose, the communication bus 30 that traverses the terminal connector 26 on the daughtercard and the daughtercard insertion receptacle 16 on the motherboard 10 includes an application firmware control link 31, as well as a flash memory communication bus 32 coupled to both the motherboard's application firmware flash memory 14 and the daughtercard's application firmware flash memory 23. The firmware control link 31 provides a signal D_ID that represents which application flash memory is to be employed by the motherboard's processor. As described briefly above, in the absence of insertion of a daughtercard, control link 31 is normally pulled high (e.g., the D_ID signal is a logical '1') by a pull-up resistor 33 coupled to Vdd. In this state the daughtercard detector logic circuit 15 steers the processor 12 to the default firmware within the flash memory 14. However, if a daughtercard has been inserted into the daughtercard receptacle 16, the daughtercard termination 34 of the control link 31, which is coupled to ground, will pull the control link low (e.g., the D_ID signal is a logical '0'). For this state the daughtercard detector logic circuit 15 steers the processor 12 over link 32 to the application firmware within daughtercard-resident flash memory 23.

For purposes of providing a non-limiting example, the daughtercard detector logic circuit 15 may be programmed with the following control code:

Normal Program Flash Memory (4M) base card
  nFLASHCSL<-'0' when (nCS(3)='0' and A21='0' and D_ID='1') else '1';
Normal Access High 2 MB base card
  nFLASHCSH<-'0' when (nCS(3)='0' and A21='1' and D_ID='1') else '1';
Normal Access High 2 MB base card (optional)
  Normal Program Flash Memory (4M) daughter card
  nDFLASH_CSL<-'0' when (nCS(3)='0' and A21='0' and D_ID='0') else '1';
Normal Access Low 2 MB daughter
  nDFLASH_CSH<-'0' when (nCS(3)='0' and A21='1' and D_ID='0') else '1';
Normal Access High 2 MB daughter (optional)

Because the application firmware stored in flash memory 23 is intimately related with and serves to control operation of the daughtercard's on-board hardware (e.g., transceiver 24), and the control processor 12 on board the motherboard derives its control functionality exclusively from the daughtercard, no modification of either hardware or software of the motherboard is required. Where the daughtercard contains a digital communication interface, such as one of those referenced above, that interface is coupled via external ports to an associated communication link for transporting corresponding communication signals with respective a source/destination therefor.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with signal processing equipment having a motherboard that contains a main processing unit, said main processing unit being adapted to communicate with a daughtercard inserted into a receptacle therefor, said daughtercard containing auxiliary hardware adapted to be interfaced via associated input/output utility device ports to signal source/termination utility devices external to said signal processing equipment, a method of controlling the operation of said signal processing equipment comprising the steps of:

(a) providing said motherboard with a default operation control mechanism, which defines a first software and hardware functionality for said signal processing equipment and is executed by said motherboard in the absence of a daughtercard being coupled with said receptacle;

(b) providing said daughtercard with a replacement operation control mechanism, which defines a second software and hardware functionality for said signal processing equipment, different from said first hardware functionality, and which is to be executed by said motherboard in place of said default operation control mechanism; and (c) causing said motherboard to execute said default operation control mechanism on said motherboard and thereby cause said signal processing equipment to acquire said first software and hardware functionality, in the absence of a daughtercard being coupled with said receptacle, but causing said motherboard to execute said replacement operation control mechanism on said daughtercard rather than said default operation control mechanism on said motherboard, and thereby cause said signal processing equipment to acquire said second software and hardware functionality, in response to said daughtercard being coupled with said receptacle; and wherein said signal processing equipment comprises a test apparatus for telecommunication equipment, and said daughtercard contains a telecommunication transceiver by way of which said motherboard communicates with telecommunication equipment under test by said test apparatus.

2. A signal processing apparatus comprising:

a motherboard containing a main processing unit that is adapted to communicate with a daughtercard inserted into a receptacle therefor, and memory storing default application firmware which is executable by said main processing unit, and defines a first software and hardware functionality for said signal processing apparatus; and a daughtercard containing auxiliary hardware adapted to be interfaced via associated input/output utility device ports to signal source/termination utility devices external to said signal processing apparatus, and memory storing replacement application firmware, which is executable by said main processing unit, and defines a second software and hardware functionality for said signal processing apparatus, different from said first hardware functionality; and wherein said motherboard is operative to execute said default operation control mechanism on said motherboard and thereby cause said signal processing apparatus to acquire said first software and hardware functionality, in the absence of a daughtercard being coupled with said receptacle, and is operative to execute said replacement operation control mechanism on said daughtercard rather than said default operation control mechanism on said motherboard, and thereby cause said signal processing apparatus to acquire said second software and hardware functionality, in response to said daughtercard being coupled with said receptacle; and wherein said signal processing apparatus comprises a test device for telecommunication equipment!and said daughtercard contains a telecommunication transceiver by way of which said motherboard communicates with telecommunication equipment under test by said test device.

3. For use with a signal processing system having a default hardware configuration and an associated default operational functionality, and including a motherboard that contains a main processing unit and associated memory that contains default system control software, which defines said default operational functionality for said signal processing system and is executed by said main processing unit of said motherboard, so as to control said default hardware configuration and associated default operational functionality of said signal processing system, in the absence of a daughtercard being inserted into a daughtercard receptacle that is coupled with said main processing unit, a method of changing the hardware configuration and operational functionality of said signal processing system from said default hardware configuration and associated default operational functionality to a different hardware configuration and a different system operational functionality, said method comprising the steps of:

(a) providing said daughtercard with on-board hardware, that is in addition to and different from hardware contained in said default hardware configuration of said signal processing system, and on-board memory, that contains replacement system control software defining said different system operational functionality and which, when executed by said main processing unit of said motherboard in place of said default system control software, is effective to control said different system operational functionality, including operation of said on-board hardware of said daughtercard; and (b) in response to said daughtercard being coupled with said receptacle, causing said main processing unit of said motherboard to execute said replacement system control software contained in said onboard memory of said daughtercard, in place of said default system control software contained in said associated memory of said motherboard, and thereby cause said signal processing system to acquire said different hardware configuration and system operational functionality, so that said main processing unit of said motherboard controls said different system operational functionality, including operation of said onboard hardware of said daughtercard, exclusively by way of said replacement system control software contained in said onboard memory of said daughtercard, and wherein said on-board hardware of said daughtercard comprises a telecommunication transceiver by way of which said motherboard communicates with telecommunication equipment under test.

4. A signal processing system comprising:

a motherboard having a main processing unit and associated memory that contains default system control software, which defines default system operational functionality for said signal processing system, and is executed by said main processing unit of said motherboard so as to control a default hardware configuration and said default system operational functionality, in the absence of a daughtercard being inserted into a daughtercard receptacle coupled with said main processing unit;

a daughtercard having on-board hardware, that is in addition to and different from hardware contained in said default hardware configuration of said signal processing system, and on-board memory, that contains replacement system control defining different system operational functionality and which, when executed by said main processing unit of said motherboard in place of said default system control software, is effective to control said different system operational functionality including operation of said onboard hardware of said daughtercard; and wherein said main processing unit of said motherboard is operative, in response to said daughtercard being coupled with said receptacle, to execute said replacement system control software contained in said on-board memory of said daughtercard, in place of said default system control software contained in said associated memory of said motherboard, and thereby cause said signal processing system to acquire said different hardware configuration and different system operational functionality, so that said different system operational functionality, including operation of said on-board hardware of said daughtercard, is controlled by said main processing unit of said motherboard exclusively by way of said replacement system control software contained in said onboard memory of said daughtercard, and wherein said on-board hardware of said daughtercard comprises a telecommunication transceiver by way of which said motherboard communicates with telecommunication equipment under test.

* * * * *